United States Patent
Bansal et al.

(10) Patent No.: US 10,805,353 B2
(45) Date of Patent: Oct. 13, 2020

(54) SECURITY TOOL

(71) Applicant: Bank of America Corporation, Charlotte, NC (US)

(72) Inventors: Gaurav Bansal, Hyderabad (IN); Sunish Satapathy, Hyderabad (IN); Prajit Kumar Datta, Chhattisgarh (IN); Dheeraj Singh, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 157 days.

(21) Appl. No.: 16/142,156

(22) Filed: Sep. 26, 2018

(65) Prior Publication Data
US 2020/0099720 A1     Mar. 26, 2020

(51) Int. Cl.
*H04L 29/06* (2006.01)
*H04L 12/24* (2006.01)
*H04L 29/08* (2006.01)
*G06N 20/00* (2019.01)

(52) U.S. Cl.
CPC ............ *H04L 63/20* (2013.01); *G06N 20/00* (2019.01); *H04L 41/082* (2013.01); *H04L 67/10* (2013.01)

(58) Field of Classification Search
CPC ....... H04L 63/20; H04L 41/082; H04L 67/10; G06N 20/00

USPC .......................................................... 726/3
See application file for complete search history.

(56) References Cited

U.S. PATENT DOCUMENTS

| | | | |
|---|---|---|---|
| 6,157,921 A | 12/2000 | Barnhill | |
| 7,849,032 B1 | 12/2010 | Campos et al. | |
| 8,027,938 B1 | 9/2011 | Xu et al. | |
| 9,413,779 B2 | 8/2016 | Vasseur et al. | |
| 9,563,854 B2 | 2/2017 | Cruz Mota et al. | |
| 9,633,315 B2 | 4/2017 | Chapelle et al. | |
| 10,402,469 B2 * | 9/2019 | McMahan | G06F 17/17 |
| 2013/0290223 A1 | 10/2013 | Chapelle et al. | |
| 2017/0220949 A1 * | 8/2017 | Feng | H04L 41/16 |
| 2018/0018590 A1 * | 1/2018 | Szeto | G16H 50/20 |
| 2018/0336362 A1 * | 11/2018 | Guttmann | G06N 5/022 |
| 2018/0365580 A1 * | 12/2018 | Musuvathi | G06Q 30/0269 |
| 2019/0304472 A1 * | 10/2019 | Pendyala | G10L 17/26 |
| 2020/0027033 A1 * | 1/2020 | Garg | H04L 67/34 |
| 2020/0034747 A1 * | 1/2020 | Elturki | G06N 3/08 |

* cited by examiner

*Primary Examiner* — Khalil Naghdali
(74) *Attorney, Agent, or Firm* — Mihcael A. Springs (57) ABSTRACT

A system includes devices, first and second cluster servers, and a global server. The first cluster server updates a second set of parameters for the first device and a first set of parameters for the second device. The second cluster server updates a fourth set of parameters for the third device and a third set of parameters for the fourth device. The global server updates the first set of parameters and the second set of parameters for the second cluster server and updates the third set of parameters and the fourth set of parameters for the first cluster server.

20 Claims, 4 Drawing Sheets

SECURITY TOOL

TECHNICAL FIELD

This disclosure relates generally to network security.

BACKGROUND

Computers and mobile devices are increasingly used in large networks. These networks may prevent these devices from performing certain actions to improve network security.

SUMMARY OF THE DISCLOSURE

Computers and mobile devices are increasingly used in large networks. These networks may prevent these devices from performing certain actions to improve network security. Some networks may use machine learning models to determine which types of actions a device is allowed or not allowed to perform. When a user attempts to perform an action on the network, the machine learning model may be consulted to determine whether the action is allowed. For example, if the action is similar or analogous to other allowed actions, the model may allow the device to perform the action. On the other hand, if the action is similar or analogous to other disallowed actions, the model may prevent the device from performing the action. In this manner, an administrator need not evaluate each new action or threat that appears on the network.

As networks grow larger and the types of devices increases, it may become difficult to anticipate every action that a device can perform on the network. When a new action or threat is detected, the machine learning model will need to be updated to account for the new action or threat. These updates may take a significant amount of time and energy, which delays the ability of the machine learning model to mitigate or prevent the consequences of the new action or threat. As a result, the network and devices on the network may be exposed to security threats.

This disclosure contemplates a security tool and/or system that allows the machine learning model to update quickly and efficiently when a new action or threat is detected. Generally, the tool and/or system employ a hierarchical learning model that is deployed across devices on the network. For example, user devices may execute the learning model to determine whether actions performed on those individual devices are allowed. These learning models may update parameters on those devices in response to new actions and/or threats on those devices. At a higher tier, certain devices are clustered. The security tool and/or system determines whether to update the learning model for a cluster of devices when a sufficient number of parameters of the devices in a cluster have been updated. At an even higher tier, the security tool and/or system determines whether to update a global learning model that is pushed to multiple clusters when a sufficient number of parameters of the clusters have been updated. In this manner, actions that do not pose a significant threat to the network may not trigger an update of the global learning model, but only update of the learning model on a few devices. On the other hand, significant threats may trigger an update of the global learning model and these updates may be pushed to clusters and individual devices. As a result, the learning model is updated efficiently and proportionally to the type of action or threat. Certain embodiments of the security tool and/or system are described below.

According to an embodiment, a system includes a plurality of devices, a first cluster server, a second cluster server, and a global server. A first device of the plurality of devices updates a first set of parameters in response to a user action performed on the first device. A second device of the plurality of devices updates a second set of parameters in response to a user action performed on the second device. A third device of the plurality of devices updates a third set of parameters in response to a user action performed on the third device. A fourth device of the plurality of devices updates a fourth set of parameters in response to a user action performed on the fourth device. The first set of parameters is different from the second set of parameters. The third set of parameters is different from the fourth set of parameters. The first cluster server updates the second set of parameters for the first device and the first set of parameters for the second device when a sum of a number of parameters of the first set of parameters and a number of parameters of the second set of parameters exceeds a first cluster threshold. The second cluster server updates the fourth set of parameters for the third device and the third set of parameters for the fourth device when a sum of a number of parameters of the third set of parameters and a number of parameters of the fourth set of parameters exceeds a second cluster threshold. The global server updates the first set of parameters and the second set of parameters for the second cluster server when a sum of a number of parameters of the first set of parameters and a number of parameters of the second set of parameters exceeds a global threshold and updates the third set of parameters and the fourth set of parameters for the first cluster server when a sum of a number of parameters of the second set of parameters and a number of parameters of the fourth set of parameters exceeds the global threshold.

According to another embodiment, a method includes updating, by a first device of a plurality of devices, a first set of parameters in response to a user action performed on the first device and updating, by a second device of the plurality of devices, a second set of parameters in response to a user action performed on the second device. The method also includes updating, by a third device of the plurality of devices, a third set of parameters in response to a user action performed on the third device and updating, by a fourth device of the plurality of devices, a fourth set of parameters in response to a user action performed on the fourth device. The first set of parameters different from the second set of parameters. The third set of parameters different from the fourth set of parameters. The method further includes updating, by a first cluster server, the second set of parameters for the first device and the first set of parameters for the second device when a sum of a number of parameters of the first set of parameters and a number of parameters of the second set of parameters exceeds a first cluster threshold and updating, by a second cluster server, the fourth set of parameters for the third device and the third set of parameters for the fourth device when a sum of a number of parameters of the third set of parameters and a number of parameters of the fourth set of parameters exceeds a second cluster threshold. The method also includes updating, by a global server, the first set of parameters and the second set of parameters for the second cluster server when a sum of a number of parameters of the first set of parameters and a number of parameters of the second set of parameters exceeds a global threshold and updating, by the global server, the third set of parameters and the fourth set of parameters for the first cluster server when a sum of a number of parameters of the second set of parameters and a number of parameters of the fourth set of parameters exceeds the global threshold.

According to yet another embodiment, an apparatus includes a memory and a processor communicatively coupled to the memory. The processor determines that a first device of a plurality of devices updated a first set of parameters in response to a user action performed on the first device and determines that a second device of the plurality of devices updated a second set of parameters in response to a user action performed on the second device. The processor also determines that a third device of the plurality of devices updated a third set of parameters in response to a user action performed on the third device and determines that a fourth device of the plurality of devices updated a fourth set of parameters in response to a user action performed on the fourth device. The first set of parameters is different from the second set of parameters. The third set of parameters is different from the fourth set of parameters. The processor further updates the second set of parameters for the first device and the first set of parameters for the second device when a sum of a number of parameters of the first set of parameters and a number of parameters of the second set of parameters exceeds a first cluster threshold and updates the fourth set of parameters for the third device and the third set of parameters for the fourth device when a sum of a number of parameters of the third set of parameters and a number of parameters of the fourth set of parameters exceeds a second cluster threshold. The processor also updates the first set of parameters and the second set of parameters for the second cluster server when a sum of a number of parameters of the first set of parameters and a number of parameters of the second set of parameters exceeds a global threshold and updates the third set of parameters and the fourth set of parameters for the first cluster server when a sum of a number of parameters of the second set of parameters and a number of parameters of the fourth set of parameters exceeds the global threshold.

Certain embodiments provide one or more technical advantages. For example, an embodiment improves the security of a network by reducing the amount of time it takes a machine learning model to update for a new action and/or threat. As another example, an embodiment improves network security by improving the efficiency of a learning model's ability to update for different types of actions and/or threats. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
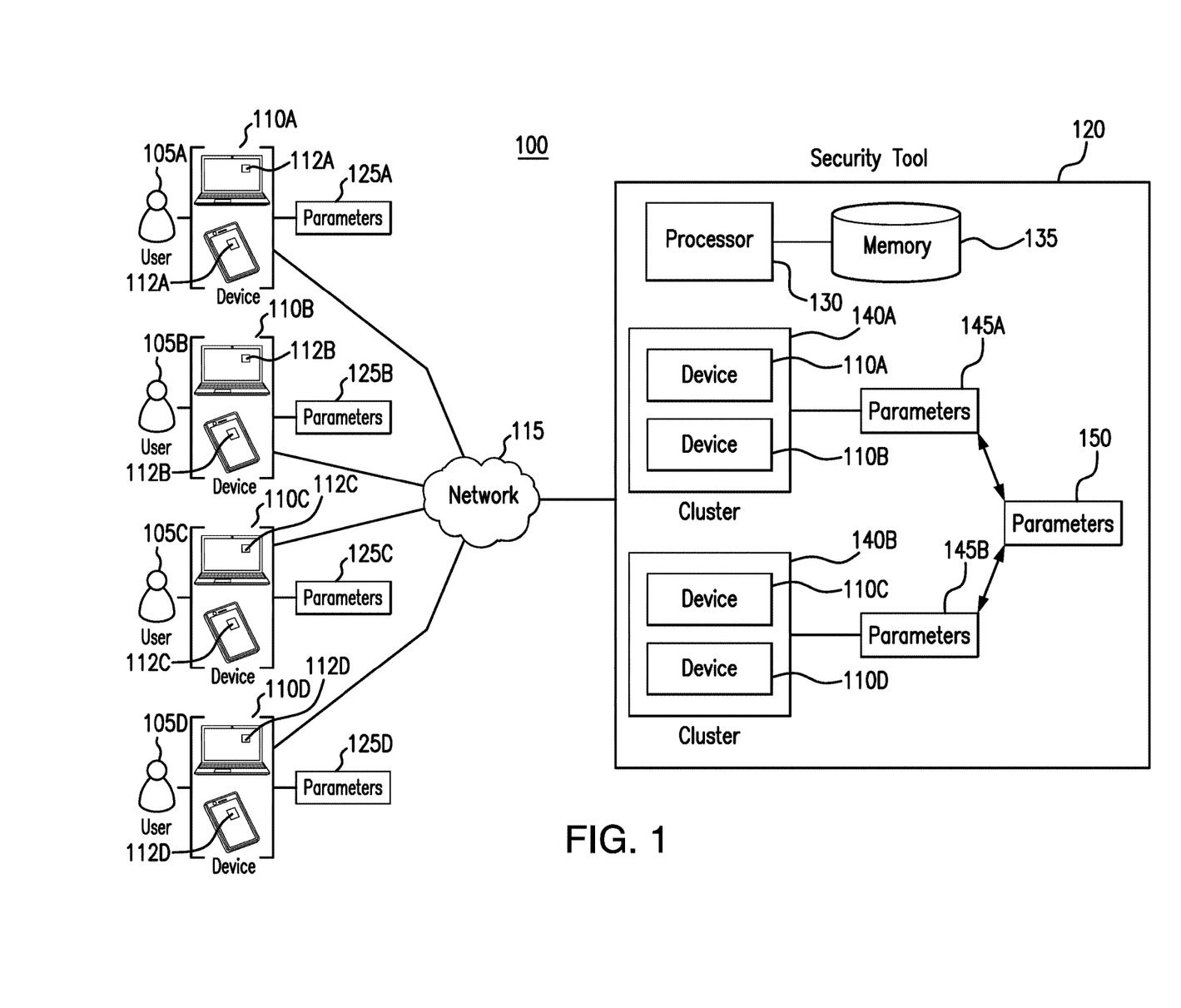
FIG. 1 illustrates an example system.
Figure 2:
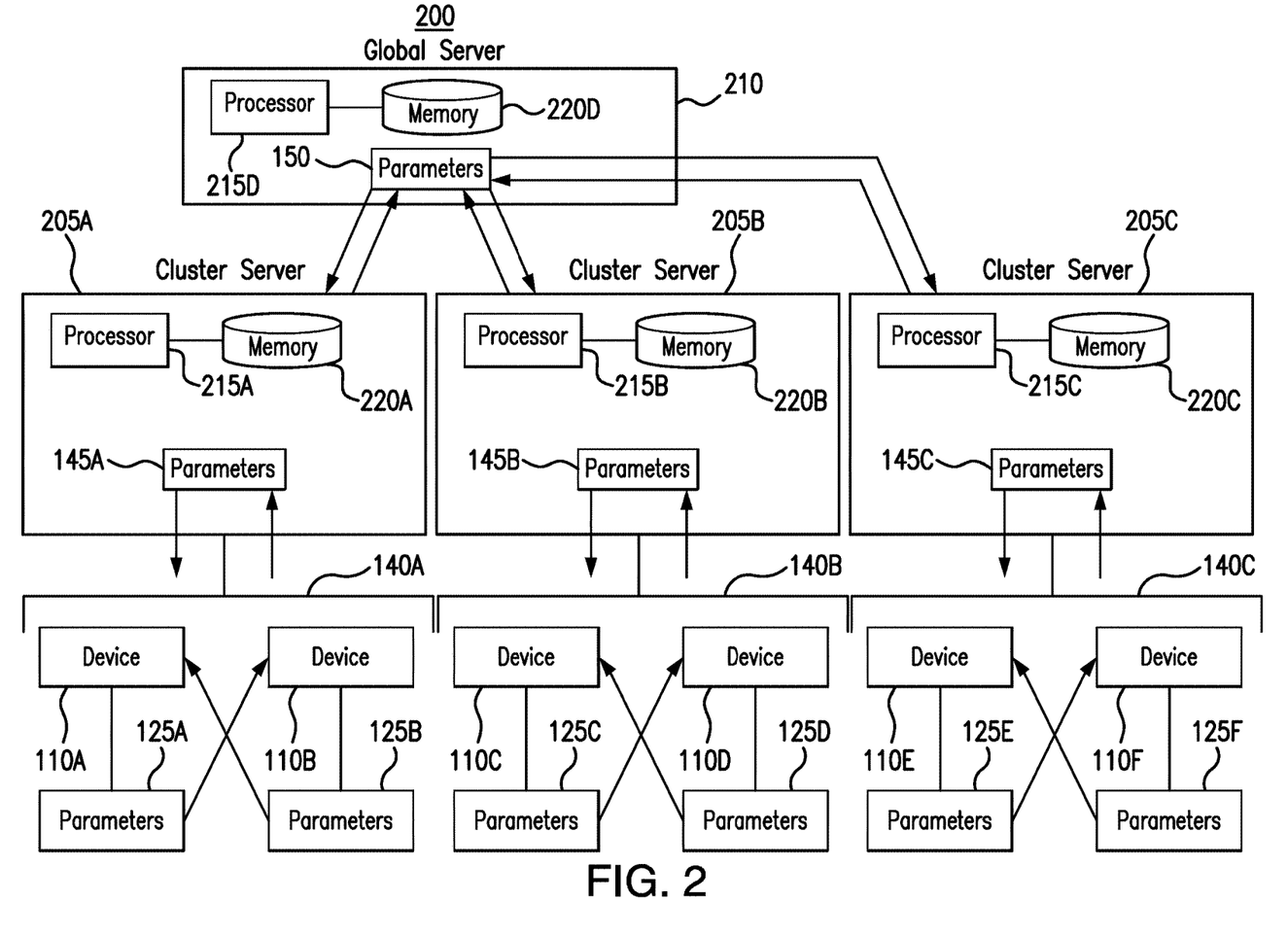
FIG. 2 illustrates an example system.
Figure 3:
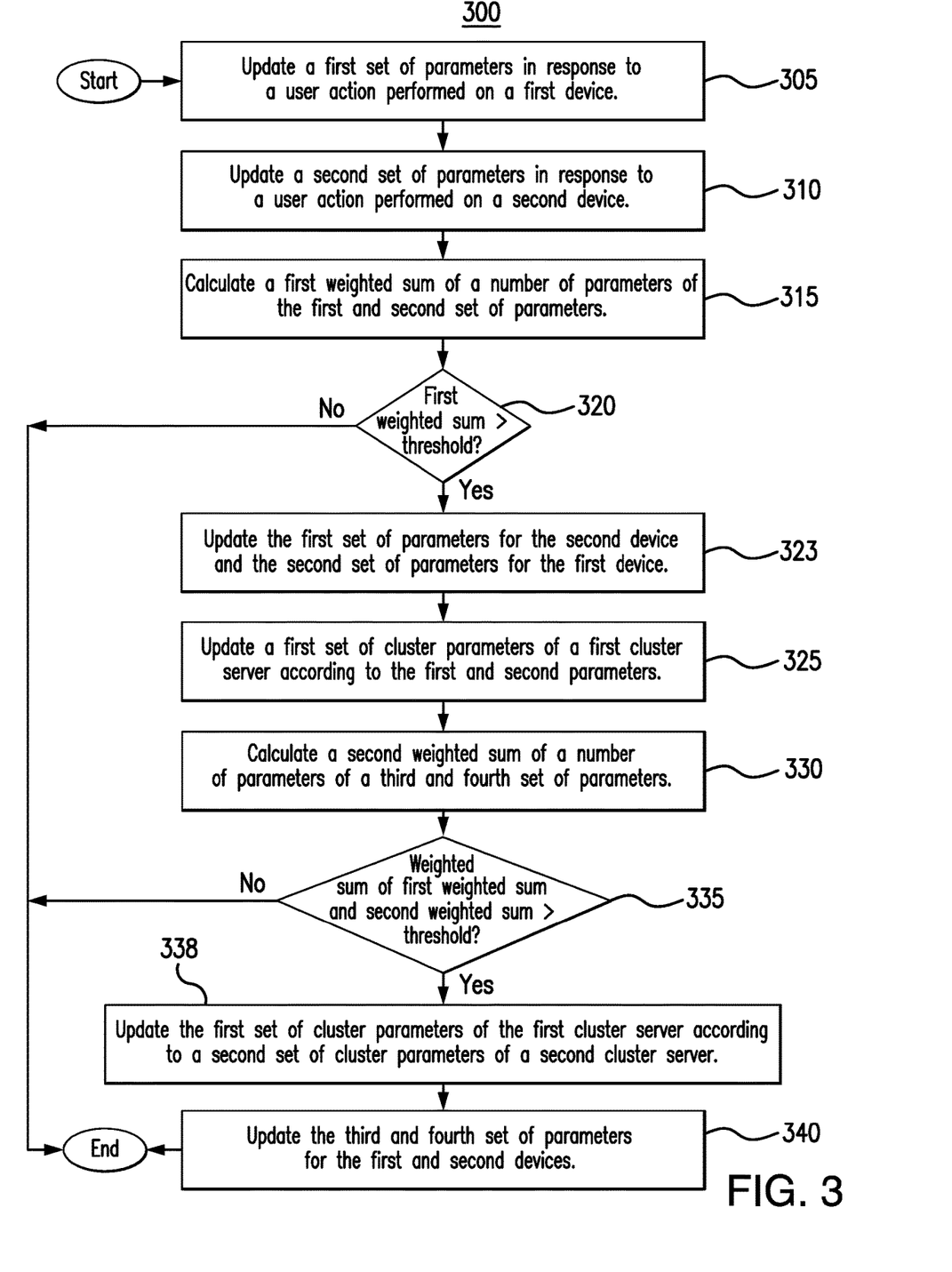
FIG. 3 is a flowchart illustrating a method for improving security using the systems of FIG. 1 or 2.

Embodiments of the present disclosure and its advantages are best understood by referring to FIGS. 1 through 3 of the drawings, like numerals being used for like and corresponding parts of the various drawings.

Computers and mobile devices are increasingly used in large networks. These networks may prevent these devices from performing certain actions to improve network security. Some networks may use machine learning models to determine which types of actions a device is allowed or not allowed to perform. When a user attempts to perform an action on the network, the machine learning model may be consulted to determine whether the action is allowed. For example, if the action is similar or analogous to other allowed actions, the model may allow the device to perform the action. On the other hand, if the action is similar or analogous to other disallowed actions, the model may prevent the device from performing the action. In this manner, an administrator need not evaluate each action or threat that appears on the network.

As networks grow larger and the types of devices increases, it may become difficult to anticipate every action that a device can perform on the network. When a new action or threat is detected, the machine learning model will need to be updated to account for the new action or threat. These updates may take a significant amount of time and energy, which delays the ability of the machine learning model to mitigate or prevent the consequences of the new action or threat. As a result, the network and devices on the network may be exposed to security threats.

This disclosure contemplates a security tool and/or system that allows the machine learning model to update quickly and efficiently when a new action or threat is detected. Generally, the tool and/or system employ a hierarchical learning model that is deployed across devices on the network. For example, user devices may execute the learning model to determine whether actions performed on those individual devices are allowed. These learning models may update parameters on those devices in response to new actions and/or threats on those devices. At a higher tier, certain devices are clustered. The security tool and/or system determines whether to update the learning model for a cluster of devices when a sufficient number of parameters of the devices in a cluster have been updated. At an even higher tier, the security tool and/or system determines whether to update a global learning model that is pushed to multiple clusters when a sufficient number of parameters of the clusters have been updated. In this manner, actions that do not pose a significant threat to the network may not trigger an update of the global learning model, but only update of the learning model on a few devices. On the other hand, significant threats may trigger an update of the global learning model and these updates may be pushed to clusters and individual devices. As a result, the learning model is updated efficiently and proportionally to the type of action or threat. The security tool and/or system will be described in more detail below using FIGS. 1 through 3.

FIG. 1 illustrates an example system 100. As shown in FIG. 1, system 100 includes one or more devices 110, a network 115 and a security tool 120. Generally, devices 110 and security tool 120 implement a hierarchical machine learning model that determines when certain actions present a threat to network 115 and disallow such actions. The model is implemented in various tiers that allow the model to update efficiently and quickly for new actions and threats experienced by system 100. At a lowest tier are devices 110 that implement local copies of the learning model. Each device 110 updates its own version of the model without necessarily impacting other devices 110. At the next tier, multiple devices 110 are grouped into clusters. When a sufficient number of updates have occurred for the devices 110 in a cluster, security tool 120 triggers a cluster update that pushes these updates to each device 110 in a cluster. At the highest tier, multiple clusters are grouped together in a global model. When a sufficient number of updates have occurred in the clusters, security tool 120 triggers a global update that pushes these updates to every cluster. In this manner, the security of network 115 is maintained in a tiered approach.

Device 110 is any suitable device that allows a user 105 to communicate with security tool 120 over network 115. Device 110 executes an application 112 stored within device 110. Application 112 may detect an action of a user 105 using device 110 and analyze that action against a hierarchical machine learning model. Application 112 may implement a local version of the hierarchical machine learning model. In particular embodiments, application 112 may manage and use parameters 125 stored in device 110. These parameters 125 are consulted to determine when a detected action should be allowed or disallowed. Parameters 125 may indicate certain types of actions that are not allowed. For example, parameters 125 may indicate certain websites and or network destinations that user 105 is not allowed to access. As another example, parameters 125 may indicate that user 105 is not allowed to save files over network 115 or download applications over network 115. This disclosure contemplates parameters 125 indicating any action of a user 105 is allowed or not allowed.

Each device 110 implements its own local version of application 112 and or parameters 125. As shown in FIG. 1, device 110A implements application 112A, which uses parameters 125A. Device 110B implements application 112B, which uses parameters 125B. Device 110C implements application 112C, which uses parameters 125C. Device 110D implements application 112D, which uses parameters 125D. Each device 110 may use parameters 125 that are different from parameters 125 of the other devices 110. For example, parameters 125A may not be the same as parameters 125B. Likewise, parameters 125B may not be the same as parameters 125C, and so on. These different parameters may result from users 105 being different types of users, devices 110 being different types of devices, and/or devices 110 being used over different parts of network 115. As new action and threats are experienced by a device 110, the hierarchical learning model implemented locally on device 110 may update the parameters 125 within device 110 to account for the new action or threat. As the number of users 105 and/or devices 110 grow within system 100, more actions and/or threats may be experienced by devices 110. As a result, parameters 125 may vary wildly across different devices 110. Whenever each new device experiences a new action or threat, the application 112 executed locally by device 110 may not have visibility as to the other parameters 125 being used by other devices 110, which may indicate how to handle the new action or threat. As a result, the device 110 is left to its own to discover how to handle the new action or threat, even though other devices 110 on network 115 know how to handle the new action or threat.

Additionally, when new actions or threats are experienced by many devices 110 in system 100, a global update of parameters 125 in every device 110 may be performed. However, the global update may take a lot of time and resources because of the number of devices 110 on network 115. As a result, the update may delay the devices' 110 ability to respond to the new action and or threat. Furthermore, the updates may be performed on devices 110 that do not experience the new action and or threat. For example, devices 110 operating on a certain portion of network 115 may not experience the same threats as devices 110 operating on another portion of network 115. Likewise, devices 110 that are operated by a certain class of user 105 may not experience the same actions and/or threats experienced by devices 110 being operated by another class of user 105. As a result, the global update may result in a waste of resources.

Devices 110 include any appropriate device for communicating with components of system 100 over network 115. For example, devices 110 may be a telephone, a mobile phone, a computer, a laptop, a tablet and/or an automated assistant. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Security tool 120 includes a processor 130 and a memory 135. This disclosure contemplates processor 130 and memory 135 being implemented to perform any of the functions of security tool 120 described herein. Generally, security tool 120 manages the hierarchies for a hierarchical learning model and triggers appropriate cluster and or global updates to parameters 125. In this manner, security tool 120 determines when certain hierarchies of updates of parameters should be performed and efficiently updates the effected devices 110.

Processor 130 is any electronic circuitry, including, but not limited to microprocessors, application specific integrated circuits (ASIC), application specific instruction set processor (ASIP), and/or state machines, that communicatively couples to memory 135 and controls the operation of security tool 120. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of security tool 120 by processing information received from network 115, device(s)

110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

Security tool 120 arranges devices 110 on network 115 into clusters 140. In the example of FIG. 1 devices 110A and 110B are grouped into cluster 140A. Devices 110C and 110D are grouped into cluster 140B. Security tool 120 may cluster devices 110 in any appropriate manner based on any appropriate criterion. For example, security tool 120 may cluster devices 110 based on their location in network 115. As another example, security tool 120 may cluster devices 110 based on the class of user 105 assigned to device 110.

Generally, a cluster 140 of devices 110 is the second tier of the hierarchy for the hierarchical learning model. When a sufficient number of parameters 125 for the devices 110 in a particular cluster 140 are updated, security tool 120 may determine that every updated parameter 125 should be pushed to each device 110 within cluster 140. For example, security tool 120 may determine that certain actions and or threats are not phenomenon isolated to a particular device 110 when a large number of parameters 125 are updated for the devices 110 in a cluster 140. In response, security tool 120 may determine it would be most efficient and improve the security of network 115 to push the updated parameters 125 to each device 110 of the cluster 140. As seen in the example of FIG. 1, security tool 120 may collect the updated parameters 145A for the cluster 140A and the updated parameters 145B for the cluster 140B. If the number of updated parameters 145A exceeds a threshold, security tool 120 may push the updated parameters 145A to each device of cluster 140A. As a result, device 110A and device 110B may receive updated parameters 145A. Devices 110A and 110B may then update their local parameters 125A and 125B to reflect the updated parameters 145A received from security tool 120. In this manner, device 110A may update its parameters 125A for actions and threats experienced by device 110B without wasting system resources and thus, improve the security of network 115.

Likewise, security tool 120 may push updated parameters 145B to the devices of 110 of cluster 140B when the number of parameters 145B exceeds a threshold. As a result, devices 110C and 110D to update their internal parameters 125C and 125D to reflect the updated parameters 145B. As a result, device 110C may update its parameters 125C for actions and threats experienced by device 110D and vice versa.

The threshold used to determine when the number of parameters 145A and 145B are sufficient to trigger an update may be set to any suitable threshold. An administrator of security tool 120 may set the threshold based off historical performance. It may be important to set the threshold sufficiently high so that updated parameters 145A and 145B are not pushed to devices 110 too frequently and thus waste system resources. It may also be important to not set threshold too high so that parameters 145A and 145B are not pushed to devices 110 too infrequently and thus jeopardize the security of network 115.

In some embodiments, security tool 120 may weight one or more of parameters 125A, 125B, 125C, and 125D when comparing the number of changed parameters 125 against a threshold. For example, security tool 120 may attach a greater weight to parameters 125A if the application 112A is a risky or frequently used application. As another example, security tool 120 may attach a lower weight to parameters 125B if application 112B is not frequently used or is less risky. After applying the weights to the respective changed parameters, security tool 120 may calculate a weighted sum of the number of changed parameters and compare that weighted sum to a threshold to determine if a cluster update should be triggered for cluster 140A. Likewise, security tool 120 can determine a weighted sum of changed parameters 125C and 125D. That weighted sum can be compared to a threshold to determine whether a cluster update should be triggered for cluster 140B.

Security tool 120 also implements a third tier of the hierarchical learning model. In the third tier, also referred to as a global tier, security tool 120 tracks the number of parameters 145 that are updated for the clusters 140. In the example of FIG. 1, security tool 120 tracks the number of updated parameters 145A and 145B. When the total number of updated parameters 145 exceeds a threshold, security tool 120 may push a global update that includes the updated parameters 145 to each cluster 140. As a result, parameters 145A for cluster 140A may be updated with the parameters 145B of cluster 140B. Security tool 120 generates and maintains a global set of parameters 150 that represents the updated parameters 145 for each cluster 140. When the number of updated parameters exceeds the threshold, security tool 120 may push parameters to each cluster 140. The clusters 140 may then update their parameters 145 using the global parameters 150. Additionally, each device 110 within a cluster 140 may update their internal parameters 125 based on global parameters 150.

As with cluster updates, security tool 120 may determine a weighted sum of changed parameters 145A and 145B. That weighted sum may be compared to a threshold to determine whether a global update should be triggered using parameters 150.

Using the example of FIG. 1, security tool 120 may track the number of updated parameters 145A and 145B. Security tool 120 may communicate global parameters to clusters 140A and 140B when the number of updated parameters 145A and 145B exceed a threshold. Clusters 140A and 140B may then update their parameters 145A and 145B based on the received global parameters 150. Furthermore, each device 110 within cluster 140 may update their internal parameters 125 based on the received global parameters 150. As a result, cluster 140A may have its parameters 145A updated based on actions and/or threats experienced by devices 110C and 110D in cluster 140B.

It may be important to set the threshold for global updates sufficiently high so that global updates are not triggered too frequently. Global updates tend to consume the most system resources and take the most amount of time. So, if global updates are performed too frequently, then system resources may be wasted. On the other hand, it may be important to set the threshold for global updates sufficiently low so that global updates occur frequently enough. Global updates tend to impact the security of networks 115 most significantly. So, if global updates are not performed enough, then the security of network 115 suffers.

Security tool 120 implements the hierarchical learning model so that updates to devices 110 and clusters 140 occur when necessary to conserve system resources but also to maintain the security of network 115. For example, minor actions and or threats experienced by only a few devices 110 may trigger only local updates to parameters 125. More significant actions or threats that affect a larger number of devices 110 may trigger a cluster update to parameters 145. Significant threats that impact many devices 110 and or significantly threaten the security of network 115 may trigger a global update, such that every device 110 on network 115 receives that update. Using this hierarchical learning model, security tool 120 preserves system resources while maintaining the security of network 115.

FIG. 2 illustrates an example system 200. As shown in FIG. 2, system 200 includes devices 110 formed into clusters 140, clusters servers 205, and a global server 210. Generally, FIG. 2 shows a top down hierarchical structure of system 100 of FIG. 1. In some embodiments, cluster servers 205 and global server 210 maybe embodied in security tool 120. In some embodiment, clusters servers 205 and global server 210 are embodied in separate and distinct hardware units. By using system 200, the security of a network is maintained without wasting system resources during parameter updates in particular embodiments.

As seen in FIG. 2, at the bottom of the hierarchical model are devices 110. System 200 includes device 110A, device 110B, device 110 C, device 110D, device 110E, and device 110F. Each device 110, implements its own set of parameters 125. Device 110A uses parameters 125A. Device 110B use parameters 125B. Device 110C uses parameters 125C. Device 110D uses parameters 125D. Device 110E uses parameters 125E. Device 110F uses parameters 125F. This disclosure contemplates system 200 including any suitable number of devices 110.

When a device 110 experiences a new action or threat, device 110 may consult its local parameters 125 to determine whether anything should be done with regards to the action or threat. For example, local parameters 125 may indicate that an action should be disallowed or that a certain remedial measure should be taken to mitigate the threat. Parameters 125A may indicate that the user action should be prevented and or disallowed to maintain the security of the network. In response, Device 110A may prevent the user action from being performed. When a new action or new threat is perceived, device 110 may update its local parameters 125 to handle the new action or threat. These updates to the local parameters 125 may not be propagated to the other parameters 125 of other devices 110 in system 100. As a result, the device 110 may be able to handle the new action or threat but other devices 110 in system 200 may not be able to handle the new action or threat.

System 200 includes one or more clusters servers 205 that manage clusters of devices 110. In the example of FIG. 2, system 200 includes clusters server 205A, cluster server 205B, and cluster server 205C. Cluster servers 205A, 205B, and 205C implement the second tier of the hierarchical learning model. Generally, the second tier of the model manages groups of devices rather than individual devices. Cluster server 205A manages cluster 140A that includes devices 110A and 110B. Cluster server 205B manages cluster 140B, which includes device 110C and device 110D. Cluster server 205C manages cluster 140C, which includes devices 110E and 110F. Cluster Server 205A includes processor 215A and memory 220A. Cluster server 205B includes processor 215B and memory 220B. Cluster server 205C includes processor 215C and memory 220C. This disclosure contemplates processors 215A, 215B, and 215C and memories 220A, 220B, and 220C being configured to perform any of the functions of cluster server 205A, cluster server 205B, or cluster server 205C described herein. This disclosure contemplates system 200 including any suitable number of cluster servers 205.

Generally, cluster server 205 tracks updates to parameters 125 of the devices 110 in the clusters 140 managed by the cluster server 205. These updated parameters may be embodied in parameters 145A, 145B, and 145C. When the number of updated parameters 145A, 145B, or 145C exceed a threshold, cluster server 205 may push the updated parameters 145 to the devices 110 of the cluster 140 managed by cluster server 205. The devices 110 within the cluster 140 then update their local parameters 125 based on the updated parameters 145. Alternatively, the devices 110 may communicate their local parameters 145 to each device 110 within the cluster 140. The other devices may then update their own local parameters 125 based on the local parameters 125 of the other devices 110. In this manner, the devices 110 within a cluster 140 may update their parameters 125 based on the parameters 125 of other devices 110 within the same cluster 140.

Global server 210 manages the various cluster servers 205 in system 200. For example, global server 210 tracks the number of updated parameters 145 in each cluster server 205. When the number of updated parameters exceeds the threshold, global server 210 may determine that a global update should be triggered. The global update updates all of the parameters 145 for a cluster 140 and, in some cases, along with the local parameters 125 of devices 110. Because global updates require the most time and system resources, it is important that global updates not happen too frequently. On the other hand, it is important that global updates occur because global updates tend to impact the security of a network most significantly.

As seen in FIG. 2, global server 210 includes a processor 215D and a memory 220D. This disclosure contemplates processor 215D and memory 220D being configured to perform any of the functions of global server 210 described herein. Generally, global server 210 determines when a global update should occur and triggers the global update to maintain the security of a network without wasting significant system resources.

Processors 215A, 215B, 215C, and 215D are any electronic circuitry, including, but not limited to microprocessors, application specific integrated circuits (ASIC), application specific instruction set processor (ASIP), and/or state machines, that communicatively couples to memories 220A, 220B, 220C, and 220D and control the operation of cluster servers 205A, 205B, 205C, or global server 210. Processors 215A, 215B, 215C, and 215D may be 8-bit, 16-bit, 32-bit, 64-bit or of any other suitable architecture. Processors 215A, 215B, 215C, 215D may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processors 215A, 215B, 215C, 215D may include other hardware and software that operates to control and process information. Processors 215A, 215B, 215C, 215D execute software stored on memory to perform any of the functions described herein. Processors 215A, 215B, 215C, 215D control the operation and administration of cluster servers 205A, 205B, 205C or global server 210 by processing information received from network 115, device(s) 110, and memories 220A, 220B, 220C, and 220D. Processors 215A, 215B, 215C, 215D may be a programmable logic device, a microcontroller, a microprocessor, any suitable processing device, or any suitable combination of the preceding. Processors 215A, 215B, 215C, 215D are not limited to a single processing device and may encompass multiple processing devices.

Memories 220A, 220B, 220C, and 220D may store, either permanently or temporarily, data, operational software, or other information for processors 215A, 215B, 215C, and 215D. Memories 220A, 220B, 220C, and 220D may include any one or a combination of volatile or non-volatile local or remote devices suitable for storing information. For example, memories 220A, 220B, 220C, and 220D may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memories 220A, 220B, 220C, and 220D, a disk, a CD, or a flash drive. In particular embodiments, the software may include an application executable by processors 215A, 215B, 215C, and 215D to perform one or more of the functions described herein.

Global server 210 maintains global parameters 150. Global parameters 150 may represent the updated cluster parameters 145 in system 200. When cluster parameters 145 are updated, global parameters 150 are updated to reflect those changes. When a sufficient number of global parameters 150 have been updated, global server 210 may communicate global parameters 150 to each cluster server 205. In response, each cluster server 205 may push the updated parameters back down to their respective clusters 140 and devices 110. For example, global server 210 may determine that a sufficient number of global parameters 150 are updated based on a threshold when the number of updated global parameters 150 exceed that threshold. Global server 210 may push global parameters 150 to each cluster server 205. In response, cluster parameters 145 may be updated and local parameters 125 may also be updated to reflect global parameters 150.

This disclosure contemplates system 200 including any number of devices 110, clusters servers 205, and/or global server 210. In certain embodiments, each cluster server 205 and global server 210 maybe embodied in one hardware unit such as for example security tool 120.

By using system 200, local parameters 125 for a device 110 maybe updated using the parameters 125 of another device 110 within the same cluster 140 or by using parameters 125 of devices 110 in other clusters 140. For example, during a local update, device 110A may update its own local parameters 125A. These local updates may not affect other parameters such as parameters 125B, 125C or 125D. During a cluster update, device 110A may update its local parameters 125A using parameters 125B from device 110B because devices 110A and 110B are in the same cluster 140A. During a global update, clusters 140A, 140B, and 140C may update their parameters 145A, 145B, and 145C based on the cluster parameters 145A, 145B, and 145C of other clusters 140A, 140B, and 140C. If a sufficient number of parameters 145A, 145B, and 145C have changed, cluster servers 140A, 140B, and/or 140C may also trigger cluster updates that update parameters for one or more clusters 140A, 140B, and 140C. For example, during these cluster updates, device 110A may update its parameters 125A using the parameters 125C and 125D of devices 110C and 110D and/or parameters 125E and 125F of devices 110E and 110F. By using the hierarchical learning model, device 110A may update its parameters using the parameters 125 of other devices depending on the level of the update. The higher the level of the update, the more parameters 125 of other devices 110 are used to update parameters 125A.

In particular embodiments, global server 210 may trigger a global update periodically. For example, it may be expected that a global update occurs every few days. However, during that time, there may not be a sufficient number of parameters 125 that are updated to trigger a global update. In these circumstances, global server 210 may track when a previous global update occurred and trigger that global update if one has not occurred within a period of a few days. This period maybe adjusted based on the needs of the system. When a global update is triggered the global parameters 150 are pushed down to the cluster servers 205 and the clusters 140. The devices 110 then update their local parameters 125 based on the parameters of the other devices in system 200. For example, during the global update, device 110A may update its local parameters 125A based on parameters 125B, parameters 125C and parameters 125D. This may occur even though an insufficient number of parameters 125 have been updated to exceed a global threshold.

In certain embodiments, a device 110 may fail to update its local parameters 125 during an update. When this failure occurs, the device 110 may alert its assigned cluster server 205. The assigned cluster server 205 may then communicate all the parameters 125 in the system 200 to the affected device 110. As a result, the device 110 may receive a fresh and updated set of global parameters 150, which may include its own local parameters 125. Using the example of FIG. 2, if device 110A fails to update its local parameters 125A, device 110A may notify cluster server 205A of the failure. In response, cluster server 205A may push parameters 125A, parameters 125B, parameters 125C, and parameters 125D to device 110A. As a result, device 110A may receive a fresh updated copy of every parameter 125 in system 200.

Likewise, a cluster server 205 may alert global server 210 when the cluster server 205 fails to update its cluster parameters 145 during an update. For example, cluster server 205A may have failed to update its cluster parameters 145A with parameters 125C during a global update. In response, global server 210 may push global parameters 150 to the affected cluster server 205. The global parameters 150 may include the local parameters 125 in system 200. Using the example of FIG. 2, when cluster 205A experiences a failure during update, cluster server 205A may alert global server 210. In response, global server 210 may communicate global parameters 150 to cluster server 205A. Cluster server 205A may then update its cluster parameters 145A using parameters 150. The global parameters 150 may include parameters 125A, parameters 125B, parameters 125C, and parameters 125D. As a result, cluster server 205A receives a fresh and updated set of parameters 125 in system 200.

FIG. 3 is a flow chart illustrating a method 300 for improving security using the systems 100 and 200 of FIG. 1 or 2. Various components of systems 100 and/or 200 may perform the steps of method 300. In particular embodiments, these components perform method 300 to improve and/or maintain the security of a network without wasting significant system resources during an update.

In step 305, a device updates a first set of parameters in response to a user action performed on that device. In step 310, a second device updates a second set of parameters in response to a user action performed on that second device. The parameters on the first device are used by the first device. The parameters on the second device are used by the second device.

A cluster server calculates a first weighted sum of a number of parameters in the first and second set of parameters in step 315. The cluster server may manage a cluster of devices that includes both the first and the second devices. The cluster server then determines whether this first weighted sum is greater than a threshold in step 320. If the first weighted sum is not greater than the threshold, then method 300 concludes. If the first weighted sum is greater than the threshold, then the cluster server may then trigger a cluster update in which the devices within the cluster update each other's local parameters. In step 323, the first device updates the first set of parameters for the second device, and the second set of parameters for the first device. The cluster server may communicate the first and second set of parameters to both the first and second devices to perform this cluster update. The cluster server may the update a first set of cluster parameters of a first cluster server according to the first and second parameters in step 325.

A second cluster server calculates a second weighted sum of a number of parameters of a third and fourth set of parameters in step 330. The third and fourth set of parameters may correspond with a third and fourth device that are in a cluster that is different from the cluster that contains the first and second device. In step 335, a global server determines whether a weighted sum of the first weighted sum and the second weighted sum is greater than a global threshold. If that weighted sum is not greater than the global threshold, method 300 may conclude. If that weighted sum is greater than the global threshold, the global server may trigger a global update. During the global update, every device in the system may update its parameters based on the parameters of the other devices in the system, including devices from other clusters. In step 338, the first cluster server updates the first set of cluster parameters according to a second set of cluster parameters of the second cluster server. In step 340, the first and second devices update their parameters to include the third and fourth set of parameters that belong to the third and fourth devices, which may not be in the same cluster as the first and second devices. As seen in FIG. 3, method 300 includes three tiers of the hierarchical model. Steps 305 and 310 are the lowest tier, which are only device updates. Steps 315, 320, and 325 are a second tier of the model, which includes a cluster update. Steps 330, 335, and 340 are a third tier of the model, which includes a global update.

In certain embodiments, certain steps of method 300 can be repeated by additional cluster servers that administer additional clusters of devices. For clarity, these steps have been omitted, but their absence should not be construed as limiting method 300 to a certain number of cluster servers, devices, and/or clusters.

Figure 4:
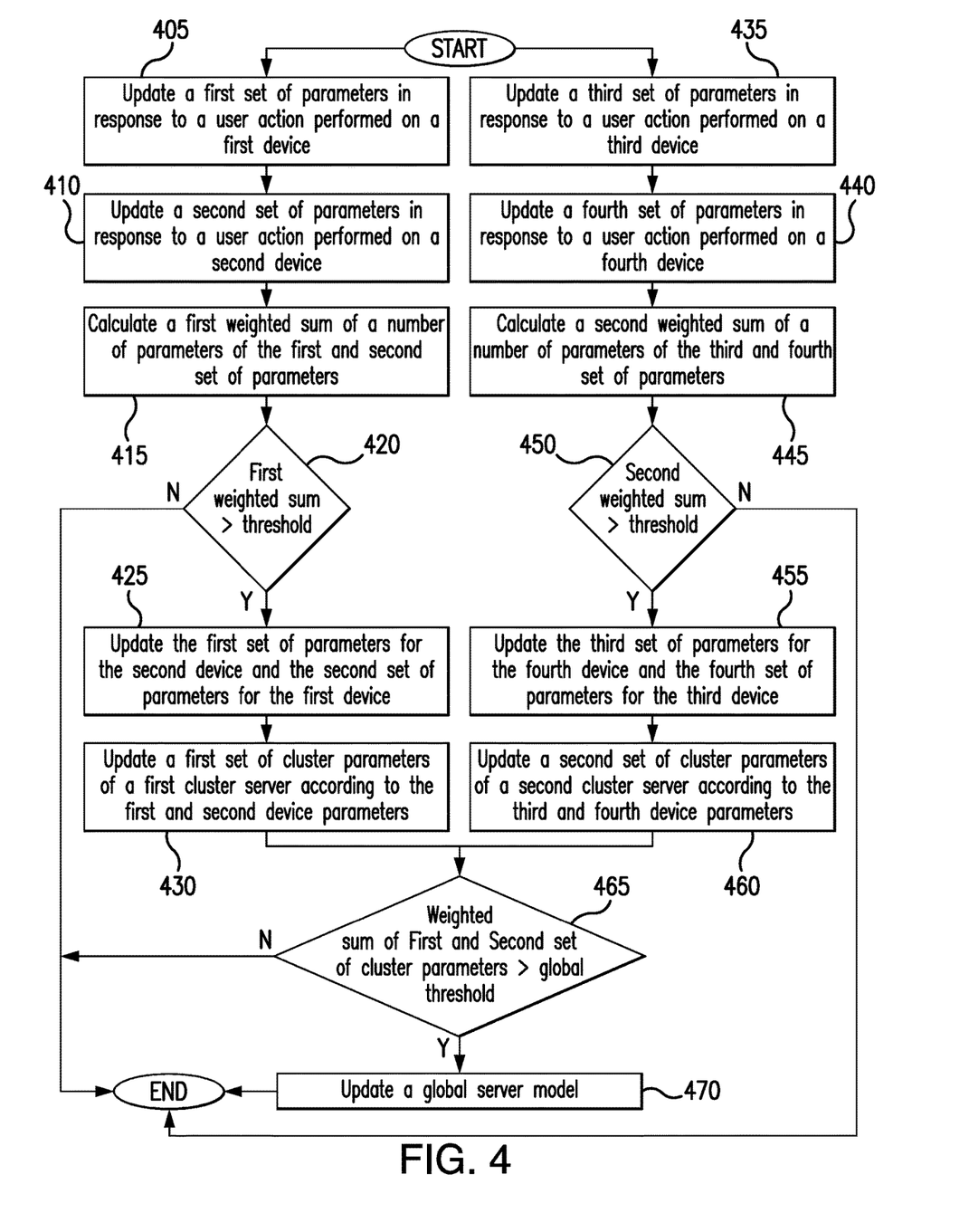
FIG. 4 is a flowchart illustrating a method for improving security using the systems of FIG. 1 or 2.

FIG. 4 is a flowchart illustrating a method 400 for improving security using the systems 100 or 200 of FIG. 1 or 2. Various components of systems 100 and/or 200 may perform the steps of method 400. In particular embodiments, these components perform method 400 to improve and/or maintain the security of a network without wasting significant system resources during an update.

In step 405, a first device updates a first set of parameters in response to a user action performed on the first device. In step 410, a second device updates a second set of parameters in response to a user action performed on the second device. A first cluster server then calculates a first weighted sum of a number of parameters of the first and second set of parameters in step 415. For example, this number of parameters may be the number of updated parameters in the first and second set of parameters. The first cluster server then determines whether the first weighted sum is greater than a threshold in step 420. If not, the first cluster server concludes. If the first weighted sum is greater than the threshold, the first cluster server triggers a cluster update. In step 425, the first cluster server updates the first set of parameters for the second device and the second set of parameters for the first device. The first cluster server updates a first set of cluster parameters of the first cluster server according to the first and second device parameters in step 430.

In step 435, a third device updates a third set of parameters in response to a user action on the third device. In step 440, a fourth device updates a fourth set of parameters in response to a user action performed on the fourth device. A second cluster server calculates a second weighted sum of a number of parameters of the third and fourth set of parameters in step 445. This number of parameters may be the number of updated parameters in the third and fourth set of parameters. The second cluster server then determines whether the second weighted sum is greater than a threshold in step 450. If not, the second cluster server concludes. If the second weighted sum is greater than the threshold, the second cluster server triggers a cluster update. In step 455, the second cluster server updates the third set of parameters for the fourth device and the fourth set of parameters for the third device. The second cluster server updates a second set of cluster parameters of the second cluster server according to the third and fourth device parameters in step 460.

A global server then calculates a weighted sum of a number of parameters of the first and second set of cluster parameters and determines whether that weighted sum is greater than a global threshold in step 465. The number of parameters may be the number of updated cluster parameters in the first and second set of cluster parameters. If the weighted sum is not greater than the threshold, global server concludes. If the weighted sum is greater than the threshold, global server updates a global server model in step 470.

Modifications, additions, or omissions may be made to methods 300 and 400 depicted in FIGS. 3 and 4. Methods 300 and 400 may include more, fewer, or other steps. For example, steps may be performed in parallel or in any suitable order. While discussed as security tool 120 or other components of systems 100 and 200 performing the steps, any suitable component of systems 100 or 200 may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system comprising:
a plurality of mobile phones, a first mobile phone of the plurality of mobile phones configured to update a first set of parameters in response to a user action performed on the first mobile phone, a second mobile phone of the plurality of mobile phones configured to update a second set of parameters in response to a user action performed on the second mobile phone, a third mobile phone of the plurality of mobile phones configured to update a third set of parameters in response to a user action performed on the third mobile phone, a fourth mobile phone of the plurality of mobile phones configured to update a fourth set of parameters in response to a user action performed on the fourth mobile phone, the first set of parameters different from the second set of parameters, the third set of parameters different from the fourth set of parameters;

a first cluster server configured to update the second set of parameters for the first mobile phone and to update the first set of parameters for the second mobile phone when a sum of a number of parameters of the first set of parameters and a number of parameters of the second set of parameters exceeds a first cluster threshold;

a second cluster server configured to update the fourth set of parameters for the third mobile phone and to update the third set of parameters for the fourth mobile phone when a sum of a number of parameters of the third set of parameters and a number of parameters of the fourth set of parameters exceeds a second cluster threshold; and a global server configured to:
update the first set of parameters and the second set of parameters for the second cluster server when a sum of a number of parameters of the first set of parameters and a number of parameters of the second set of parameters exceeds a global threshold; and
update the third set of parameters and the fourth set of parameters for the first cluster server when a sum of a number of parameters of the second set of parameters and a number of parameters of the fourth set of parameters exceeds the global threshold.

2. The system of claim 1, wherein the first cluster server is further configured to update the third set of parameters and the fourth set of parameters for the first and second mobile phones after the global server updates the third and fourth sets of parameters for the first cluster server.

3. The system of claim 1, wherein the global server is further configured to update the first, second, third, and fourth set of parameters for a third cluster server when a sum of a number of parameters of the first set of parameters, a number of parameters of the second set of parameters, a number of parameters of the third set of parameters, and a number of parameters of the fourth set of parameters exceeds the global threshold.

4. The system of claim 1, wherein the global server is further configured to update the third and fourth sets of parameters for the first cluster server when the third and fourth sets of parameters have not been updated for the first cluster server for a number of days.

5. The system of claim 1, wherein the first cluster server is further configured to communicate the first, second, third, and fourth set of parameters to the first mobile phone in response to the first mobile phone alerting the first cluster server that the first mobile phone failed to update the third set of parameters.

6. The system of claim 1, wherein the global server is further configured to communicate the first, second, third, and fourth set of parameters to the first cluster server in response to the first cluster server alerting the global server that the first cluster server failed to update the third set of parameters.

7. The system of claim 1, wherein the first mobile phone is further configured to use the first, second, third, and fourth set of parameters to prevent a user action that poses a security risk.

8. A method comprising:
updating, by a first device of a plurality of devices, a first set of parameters in response to a user action performed on the first device;
updating, by a second device of the plurality of devices, a second set of parameters in response to a user action performed on the second device;
updating, by a third device of the plurality of devices, a third set of parameters in response to a user action performed on the third device;
updating, by a fourth device of the plurality of devices, a fourth set of parameters in response to a user action performed on the fourth device, the first set of parameters different from the second set of parameters, the third set of parameters different from the fourth set of parameters;
updating, by a first cluster server, the second set of parameters for the first device and the first set of parameters for the second device when a sum of a number of parameters of the first set of parameters and a number of parameters of the second set of parameters exceeds a first cluster threshold;
updating, by a second cluster server, the fourth set of parameters for the third device and the third set of parameters for the fourth device when a sum of a number of parameters of the third set of parameters and a number of parameters of the fourth set of parameters exceeds a second cluster threshold;
updating, by a global server, the first set of parameters and the second set of parameters for the second cluster server when a sum of a number of parameters of the first set of parameters and a number of parameters of the second set of parameters exceeds a global threshold; and
updating, by the global server, the third set of parameters and the fourth set of parameters for the first cluster server when a sum of a number of parameters of the second set of parameters and a number of parameters of the fourth set of parameters exceeds the global threshold.

9. The method of claim 8, further comprising updating, by the first cluster server, the third set of parameters and the fourth set of parameters for the first and second devices after updating, by the global server, the third and fourth sets of parameters for the first cluster server.

10. The method of claim 8, further comprising updating, by the global server, the first, second, third, and fourth set of parameters for a third cluster server when a sum of a number of parameters of the first set of parameters, a number of parameters of the second set of parameters, a number of parameters of the third set of parameters, and a number of parameters of the fourth set of parameters exceeds the global threshold.

11. The method of claim 8, further comprising updating, by the global server, the third and fourth sets of parameters for the first cluster server when the third and fourth sets of parameters have not been updated for the first cluster server for a number of days.

12. The method of claim 8, further comprising communicating, by the first cluster server, the first, second, third, and fourth set of parameters to the first device in response to the first device alerting the first cluster server that the first device failed to update the third set of parameters.

13. The method of claim 8, further comprising communicating, by the global server, the first, second, third, and fourth set of parameters to the first cluster server in response to the first cluster server alerting the global server that the first cluster server failed to update the third set of parameters.

14. The method of claim 8, further comprising using, by the first device, the first, second, third, and fourth set of parameters to prevent a user action that poses a security risk.

15. An apparatus comprising:
a memory; and
a processor communicatively coupled to the memory, the processor configured to:
   determine that a first device of a plurality of devices updated a first set of parameters in response to a user action performed on the first device;
   determine that a second device of the plurality of devices updated a second set of parameters in response to a user action performed on the second device;
   determine that a third device of the plurality of devices updated a third set of parameters in response to a user action performed on the third device;
   determine that a fourth device of the plurality of devices updated a fourth set of parameters in response to a user action performed on the fourth device, the first set of parameters different from the second set of parameters, the third set of parameters different from the fourth set of parameters;
   update the second set of parameters for the first device and the first set of parameters for the second device when a sum of a number of parameters of the first set of parameters and a number of parameters of the second set of parameters exceeds a first cluster threshold;
   update the fourth set of parameters for the third device and the third set of parameters for the fourth device when a sum of a number of parameters of the third set of parameters and a number of parameters of the fourth set of parameters exceeds a second cluster threshold;
   update the first set of parameters and the second set of parameters for the second cluster server when a sum of a number of parameters of the first set of parameters and a number of parameters of the second set of parameters exceeds a global threshold; and
   update the third set of parameters and the fourth set of parameters for the first cluster server when a sum of a number of parameters of the second set of parameters and a number of parameters of the fourth set of parameters exceeds the global threshold.

16. The apparatus of claim 15, wherein the first cluster server is further configured to update the third set of parameters and the fourth set of parameters for the first and second devices after the third and fourth sets of parameters for the first cluster server are updated.

17. The apparatus of claim 15, wherein the processor is further configured to update the first, second, third, and fourth set of parameters for a third cluster server when a sum of a number of parameters of the first set of parameters, a number of parameters of the second set of parameters, a number of parameters of the third set of parameters, and a number of parameters of the fourth set of parameters exceeds the global threshold.

18. The apparatus of claim 15, wherein the processor is further configured to update the third and fourth sets of parameters for the first cluster server when the third and fourth sets of parameters have not been updated for the first cluster server for a number of days.

19. The apparatus of claim 15, wherein the first cluster server is further configured to communicate the first, second, third, and fourth set of parameters to the first device in response to the first device alerting the first cluster server that the first device failed to update the third set of parameters.

20. The apparatus of claim 15, wherein the processor is further configured to communicate the first, second, third, and fourth set of parameters to the first cluster server in response to the first cluster server alerting the global server that the first cluster server failed to update the third set of parameters.

* * * * *